United States Patent [19]

Krichten et al.

[11] 4,257,897
[45] Mar. 24, 1981

[54] PROCESS FOR REABSORPTION AND RETENTION OF PHOSPHOROUS BY ACTIVATED BIOMASS

[75] Inventors: David J. Krichten, Allentown; David M. Nicholas, New Tripoli, both of Pa.

[73] Assignee: Air Products and Chemicals, Inc., Allentown, Pa.

[21] Appl. No.: 88,664

[22] Filed: Oct. 26, 1979

[51] Int. Cl.$^3$ .......................... C02C 1/06; C02C 1/17
[52] U.S. Cl. ................................ 210/605; 210/614; 210/906
[58] Field of Search .................. 435/262; 210/2–9, 210/12, 14–16, 18, 21, DIG. 28

[56] References Cited

U.S. PATENT DOCUMENTS

| | | | |
|---|---|---|---|
| 3,386,911 | 6/1968 | Albertson | 210/15 X |
| 3,764,524 | 10/1973 | Stankewich, Jr. | 210/15 X |
| 4,056,465 | 11/1977 | Spector | 210/7 |
| 4,141,822 | 2/1979 | Levin et al. | 210/7 X |
| 4,162,153 | 7/1979 | Spector | 210/12 |

*Primary Examiner*—S. Leon Bashore
*Assistant Examiner*—Ferris H. Lander
*Attorney, Agent, or Firm*—E. Eugene Innis; Thomas G. Ryder

[57] ABSTRACT

A process for promoting the reabsorption and retention by an activated biomass of phosphorous values previously contained by the biomass and released under anaerobic conditions, which process requires initially subjecting the biomass in admixture with a liquid medium to treatment under aerobic conditions employing a relatively high DO. When the pH of the mixture stops increasing, the aerobic treatment is continued but under a second, reduced DO level.

5 Claims, No Drawings

PROCESS FOR REABSORPTION AND RETENTION OF PHOSPHOROUS BY ACTIVATED BIOMASS

BACKGROUND OF THE INVENTION

It has been found that when conducting certain activated biomass treating processes, such as, for example, a waste-water treating process, quantities of phosphorous are taken up by the biomass. It has further been found that during the course of the main processing sequence itself under anaerobic conditions there tends to be a bleed-out of phosphorous from the biomass into the liquor in which the solid biomass is suspended. It has also been found that the employment of aerobic conditions tends to prevent and even reverse this phosphorous bleed-out tendency. In this connection it has been suggested previously in the art to employ an aeration treatment prior to separation by clarification in order to prevent the material in the clarifier from going anaerobic. Discussion of this aspect of the phenomenon can be found, for example, in "A Review of Biological Phosphorous Removal in the Activated Sludge Process" by James L. Barnard, Water SA, Volume 2, Number 3, July 1976, page 136 et seq., particularly at pages 141 and 142, as well as in "Effective Phosphorous Removal from Sewage by Biological Means" by A. R. Mclaren and R. J. Wood in Water SA, Volume 2, Number 1, January 1976, page 47 et seq., particularly at page 50. While the above-mentioned papers are directed to the treatment of the mixed liquor during the processing itself, there is mention in the literature of the effects of reaerating sludge which has gone anaerobic. See for example, "Full Scale Experimentation On The New Johannesburg Extended Aeration Plants " by H. A. Nicholls in Water SA, Volume 1, Number 3, October 1975, page 121 et seq., particularly pages 127 and 128.

The suggestions of the prior art, however, have not directed themselves to the solution of the problem confronting the art today. Specifically, after having substantially completed the treatment of a phosphorous and BOD-containing wastewater, or other influent, in an of activated biomass process, typically after a final oxic or aerobic treatment, the mixed liquor entering the clarifier is composed of a liquid portion of relatively low phosphorous content and a solids or biomass component, relatively rich in phosphorous. This is particularly true when practicing the process of Spector as described in U.S. Pat. No. 4,056,465 to provide a biomass of the type claimed in U.S. Pat. No. 4,162,153. The problem still confronting the art and unresolved by the suggestions of the papers mentioned above is the two-fold problem connected with handling the portion of separated biomass which is not recycled to the process, but rather which is "wasted" and/or recovered as product, so as to insure that the biomass has a high phosphorous content while, at the same time, insuring that the liquor in which it is suspended has a low phosphorous content. It is important that the biomass have a high phosphorous content since such is desirable either as a component of the final biological product or to facilitate final separation of the biomass from the liquor. It is equally important that the liquor have a low phosphorous content since the liquor, once separated, must be disposed of or recovered as a product in which phosphorous is not desired.

Normally, in handling the biomass, particularly when in the form of sludge from a wastewater treating plant, the further treating to which it is subjected is conducted intermittently or in a batch method. Accordingly, therefore, the separated sludge must be stored for some interval of time after removal from the clarifier and before being subjected to the further treatment. The result of this storage is that the biomass goes anaerobic and phosphorous in the form of soluble phosphate bleeds out of the biomass into the liquor in which it is suspended. To overcome these problems and to facilitate the further processing of separated biomass which has gone anaerobic, it is necessary to provide a method for causing rapid reabsorption of phosphorous by the biomass, which method further results in the retention of such reabsorbed phosphorous over a protracted period of time. Unfortunately, the techniques suggested by the prior art do not teach a method for rapidly reabsorbing phosphorous nor do they suggest techniques that will cause extensive reabsorption of phosphorous by the biomass so as to provide a suspending liquor of relatively low phosphorous content. Further, the prior art does not suggest an effective means of retaining the phosphorous in the biomass once it has been reabsorbed. Specifically, the prior art does not solve the problem of rapidly reducing the phosphate content (expressed as mg/l of phosphorous) of the liquor to a level of less than about 5 mg/l and then retaining the phosphate content at this low level for an extended period of time.

This invention is directed to a process which results in a relatively rapid reabsorption of phosphorous into biomass and which also results in the retention of phosphorous in the biomass for an extended period of time.

DESCRIPTION OF THE INVENTION

The process of this invention requires the treatment of a biomass in admixture with a liquid medium, which biomass previously contained phosphorous and which phosphorous has been released under anaerobic conditions into the liquid medium. The mixture which is treated is to have an initial Chemical Oxygen Demand (COD) concentration of at least about 100 milligrams per liter. The process of the invention requires subjecting the mixture to treatment under aerobic conditions selected so as initially to maintain a high initial Dissolved Oxygen (DO) content in the mixture, i.e., greater than 3 milligrams per liter (mg/l). This treatment at a relatively high DO is discontinued when the pH of the mixture ceases to rise. The treatment is then continued while maintaining a second, lower DO content in the range from about 0.5 up to 3 mg/l. It has been found that treatment in this manner is effective so as initially to effect rapid reabsorption of phosphorous by the biomass from the liquor and then maintain the phosphorous in the biomass for an extended period of time.

Preferably, the initial DO content is maintained at a level of at least about 4 mg/l. Normally, the initial DO level need not be maintained at a value greater than about 30 and preferably less than about 25 mg/l. In connection with the second lower DO content treatment, it is preferred to maintain a DO content of less than about 2 mg/l. Generally, the lower DO content is at least about 1.

It is believed that the increasing pH of the mixture during anaerobic treatment is indicative of the consumption of COD within the system. As the consumption of COD progresses, phosphorous is taken up by the biomass from the surrounding liquid medium; thus, the use of the increasing pH as a measure of continuing phosphorous absorption appears to be sound. When the COD level in the mixture declines to a certain level, however, the preponderant action of the biomass tends not to be COD consumption and phosphorous absorption, but, rather, aerobic digestion appears to predominate resulting in the release of phosphorous from the cells into the liquid medium. This shift from COD consumption by the biomass to aerobic digestion is substantially concurrent with a lack of further increase in the pH. In fact, if the DO level maintained in the mixture is not reduced substantially, the phosphorous concentration in the liquid medium tends to rise sharply. Further, in the absence of an essential alteration in the system this increase in phosphorous content in the liquid medium continues and is not reversible. Much in the same way that the rate of phosphorous reabsorption by the biomass during the initial high DO treatment is proportional to the DO level, so also is the rate at which the phosphorous content of the mixture increases if the high DO conditions are maintained.

Accordingly, therefore, this process appears to be effective in the treatment of a biomass mixture, such as sludge from a wastewater treating plant, wherein the mixture initially contains at least about 100 milligrams per liter of COD. Similarly, it is believed that the employment of the high DO treatment in order to effect phosphorous reabsorption by the biomass will be effective until the COD concentration in the mixture declines to a level at which aerobic digestion becomes the predominant action. Generally, this phenomenon will occur when the COD level has declined to about 50 milligrams per liter.

In order to illustrate this invention, reference is made the following examples.

EXAMPLES 1-2

In the following two examples, samples of the separated sludge obtained from the processing of a municipal wastewater in accordance with the process of U.S. Pat. No. 4,056,465 was employed. The separated sludge was stored in closed drums for several days, during which time it went anaerobic before being employed in these examples. Separate samples were removed from the drum and placed into containers equipped with porous stone aerators and electric stirring motors. In both examples the sludge initially has a soluble phosphate concentration (measured as milligrams per liter of phosphorous) of about 260 milligrams per liter. In Example 1, the biomass mixture was subjected to aerobic treatment employing a DO content at a level of 6 milligrams per liter throughout the operation. In Example 2, the biomass mixture was subjected to aerobic treatment employing a DO content at a level of 10 milligrams per liter. The particular soluble phosphate content in the mixture for each of these examples at various times are set forth in Table I below.

TABLE I

| | | Time, hours | | | | | | |
|---|---|---|---|---|---|---|---|---|
| | | 0 | 0.4 | 0.8 | 1.6 | 4.8 | 24 | 48 |
| $PO_4$ P, mg/l | EX1 | 260 | 240 | 194 | 10.5 | 1.5 | 1.0 | 15.5 |
| | EX2 | 260 | 240 | 105 | 36 | 1.8 | 5.0 | 15.5 |

From the above data it can be seen that the aerobic treatment of the separated sludge was effective to reduce the soluble phosphate content to an extremely low level within a short period of time. Unfortunately, however, continued treatment under the same initially successful DO levels simply resulted in new phosphorous bleed out and failed to retain the readsorbed phosphorous in the biomass.

EXAMPLE 3

In this example, another sample of the same biomass mixture as employed in Examples 1 and 2 was subjected to two days of anaerobic conditions maintained by bubbling nitrogen through the sample. This resulted in an increase in the soluble phosphate contained in the liquor from the level of about 260 milligrams per liter up to about 370 milligrams per liter. Thereafter, the sample was subjected to aerobic treatment employing a DO content at a level of 10 milligrams per liter.

The soluble phosphorous content at various times during this example are set forth in Table II below and these data show that a low soluble phosphorous content was achieved sometime about the fifth hour of aerobic treatment but that continued treatment at the high Do level resulted in the renewal of phosphorous bleed out before the second 24 hours of aerobic treatment.

TABLE II

| | Time, hrs. | | | | | | | | |
|---|---|---|---|---|---|---|---|---|---|
| | 0 | 24 | 48 | 49 | 50 | 51 | 53 | 72 | 96 | 120 |
| $PO_4$ as P, mg/l | 260 | 340 | 360 | 320 | 190 | 160 | 3.5 | 2.0 | 5.6 | 19 |

EXAMPLE 4

In this example, using another sample of the same biomass mixture as in the previous examples, the soluble phosphate content in the liquor was reduced from the level of about 260 milligrams per liter to about 1.25 milligrams per liter and thereafter the mixture was subjected to further aerobic treatment employing a DO content at a level of 2.0 milligrams per liter. In this example at the end of 24 hours of treatment, the DO level was 1.25 milligrams per liter and at the end of 48 hours, it was measured at 1.28 milligrams per liter (not believed to be a significant difference).

Review of the data from Examples 1 through 4 demonstrate that while an initial high DO content is effective to reduce the soluble phosphate level in the mixture rapidly to a level below about 5 milligrams per liter, or even less than about 2 milligrams per liter, the continued treatment at this relatively high DO level simply results in an almost equally rapid bleedout of the phosphate, thus defeating the purpose of effecting reabsorption. On the other hand, however, the employment of a relatively low DO level, i.e. 2.0 milligrams per liter was effective to maintain the low soluble phosphate level in the mixture for an extended period once the phosphorous had been reabsorbed by the biomass.

EXAMPLE 5

Another example of a similar sludge to that employed in Examples 1 through 4 was utilized. The sludge was maintained under anaerobic conditions for a period of two days by bubbling nitrogen through the sludge. Thereafter, the sludge was subjected to aerobic treatment for a period of six days employing a Do ranging from about three to twenty milligrams per liter. As with other treatments, there was a sharp uptake in soluble phosphorous during the first five hours of aeration. Subsequent to the first 24 hours of aeration, however, there was once again a renewal of phosphorous bleed out. The particular phosphorous content, DO level and pH recorded at the various time intervals during this example are shown in Table III below.

TABLE III

| Time (hr.) | PO as P (mg/l) | pH | D.O. (mg/l) |
|---|---|---|---|
| 0.0 | 339.2 | 6.3 | 0.0 |
| 0.5 | 303.3 | 6.3 | 4.5 |
| 1.0 | 293.52 | 6.35 | 3.0 |
| 2.0 | 195.68 | 6.55 | 12.0 |
| 5.0 | 16.30 | 6.95 | 12.0 |
| 24.0 | 4.89 | 7.05 | 20.0 |
| 48.0 | 8.15 | 6.9 | 20.0 |
| 92.0 | 27.72 | 6.85 | 20.0 |
| 96.0 | 71.75 | 6.1 | 18.0 |
| 120.0 | 89.68 | 6.1 | 20.0 |
| 144.0 | 163.06 | 6.1 | 20.0 |

As can be seen from the data in Table III, there was a sharp and continuing decrease in soluble phosphorous in the liquor during the initial period of aerobic treatment. It will also be seen that the pH of the sludge mixture increased during the period that phosphorous was being taken up by the biomass. It can further be seen that when the pH stopped increasing there was no longer any phosphorous uptake and, in fact, there was the renewal of phosphorous bleed out which in turn is tracked by a decreasing pH.

EXAMPLE 6

In this example a separated sludge sustaining anaerobic phosphorous bleedout and having a soluble phosphorous content in the liquor of several hundred milligrams per liter and a soluble COD content of several hundred milligrams per liter is subjected to aerobic treatment in accordance wiht this invention. Initially the Do level selected is greater than three milligrams per liter, e.g., about five milligrams per liter. Aerobic treatment at this DO level is continued while monitoring the pH of the sludge mixture. This treamtent is continued for a period of about 5 to 10 hours, during which period the pH continuously increases. Upon detection of a failure of the pH to increase, the DO level is reduced to less than three milligrams per liter, e.g., about two milligrams per liter, and this level is maintained during the course of the next 72 to 96 hours. During this period of time, there is no substantial change in the pH nor any significant change in the soluble phosphorous level in the sludge.

We claim:

1. A process for promoting the return to and retention by a biomass of phosphorous previously contained by the biomass and released under anaerobic conditions into a liquid medium in admixture with the biomass, the liquid medium having a COD concentration of at least about 100 milligrams per liter, which process comprises subjecting the mixture to treatment under aerobic conditions selected so as initially to maintain a DO content in the range from greater than 3.0 to about 30 mg/l, while there is an increasing pH in the mixture, and when the pH of the mixture ceases to increase, then maintaining a second DO content in the range from less than 3.0 to about 0.5 mg/l.

2. The process of claim 1 wherein the initial DO content is at least about 4 mg/l.

3. The process of claim 1 wherein the second DO content is less than about 2 mg/l.

4. The process of claim 1 wherein the initial DO content is less than about 25 mg/l.

5. The process of claim 1 wherein the second DO content is at least about 1 mg/l.

* * * * *